No. 796,673. PATENTED AUG. 8, 1905.
H. G. RICHARDSON.
WINDOW SHUTTER WORKER AND LATCH.
APPLICATION FILED JULY 25, 1904.

Witnesses
J. C. Simpson.
F. C. Jones.

Inventor
H. G. Richardson
By
Attorneys

UNITED STATES PATENT OFFICE.

HORACE G. RICHARDSON, OF SAN ANTONIO, TEXAS.

WINDOW-SHUTTER WORKER AND LATCH.

No. 796,673.          Specification of Letters Patent.          Patented Aug. 8, 1905.

Application filed July 25, 1904. Serial No. 218,069.

*To all whom it may concern:*

Be it known that I, HORACE G. RICHARDSON, a citizen of the United States, residing at San Antonio, in the county of Bexar, State of Texas, have invented certain new and useful Improvements in Window-Shutter Workers and Latches; and I do hereby declare the following to be a full, clear, and exact description of the invention, such as will enable others skilled in the art to which it appertains to make and use the same.

This invention relates to window-shutters in general, and more particularly to means for opening and closing the shutters from the inside without requiring the window-sash to be raised.

Other objects and advantages of the invention will be understood from the following description.

Figure 1:
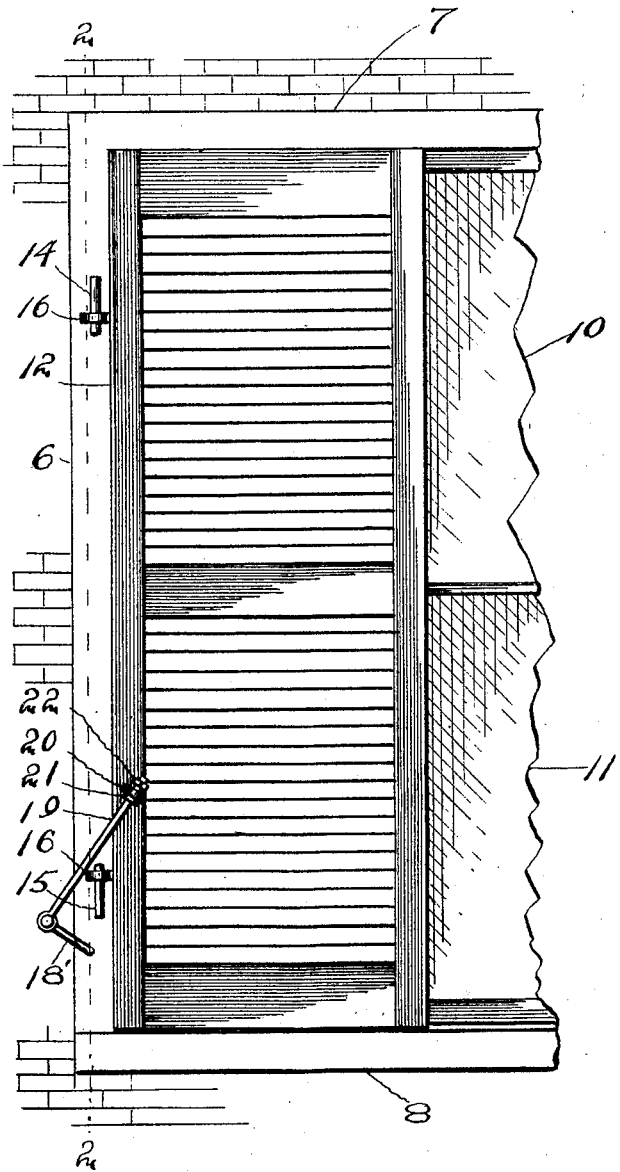
Figure 2:
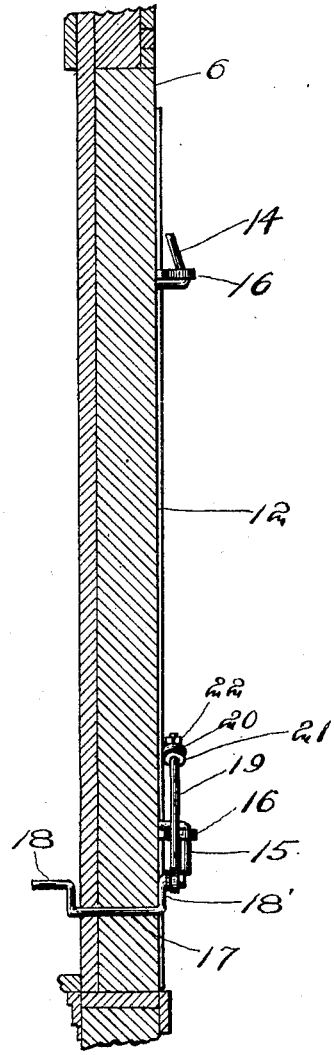

In the drawings forming a portion of this specification, and in which like numerals of reference indicate similar parts in both views, Figure 1 is an elevation showing the exterior of a window and a shutter in closed position and provided with the present mechanism. Fig. 2 is a view showing the sash in vertical section and showing the rock-shaft and connected parts in elevation.

Referring now to the drawings, there is shown a window-frame including the sides 5 and 6, top 7, and the sill 8, through which latter is formed a passage 9 to receive the latch mechanism hereinafter described. In the window-frame are the usual upper and lower sashes 10 and 11, and hinged to the outer portion of the frame is a shutter 12. The hinges employed include upper upwardly-directed pintles 14 and lower downwardly-directed pintles 15, engaged in the window frame or casing, while the shutters are provided with eyes 16, through which the pintles are passed.

Through the sides 5 and 6 of the window frame or casing are passed rock-shafts 17, having cranks 18 at their inner ends, which may be grasped from inside the window to rock the shafts. Each of the rock-shafts has at its outer end a crank-arm 18, to which is pivoted a rod 19, which is passed through an eye 20, swiveled in the outer face of the adjacent shutter near to the hinged edge thereof. The rod 19 has enlargements 21 and 22 thereon at opposite sides of the eye 20, which permit of slight longitudinal movement of the rod in the eye, so that when the rod is reciprocated it has a slight degree of lost motion with respect to the eye. With this construction it will be seen that when the rock-shaft is moved in one direction the rod will pull the shutter through the medium of the eye engaged therewith to swing the shutter open and that when the rock-shaft is moved in the opposite direction the shutter will be swung into closed position.

What is claimed is—

The combination with a window-casing and a shutter hinged thereto, of a rock-shaft journaled in the casing and projecting exteriorly and interiorly thereof, a crank at each end of the rock-shaft, an eye swiveled to the shutter adjacent to its hinged edge, a rod pivoted to the outer crank and passed through the eye and stops upon the rod at opposite sides of the eye and spaced therefrom.

In testimony whereof I affix my signature in presence of two witnesses.

HORACE G. RICHARDSON.

Witnesses:
     G. A. LOWTHER,
     ALEX JUROSSCHEK.